(12) United States Patent
Cassady

(10) Patent No.: US 6,751,017 B2
(45) Date of Patent: Jun. 15, 2004

(54) MICROSCOPE FOR BACKPLANE RIBBON FIBER ANALYSIS

(75) Inventor: Kevin G. Cassady, Monroe, WA (US)

(73) Assignee: Westover Scientific, Inc., Mill Creek, WA (US)

( * ) Notice: Subject to any disclaimer, the term of this patent is extended or adjusted under 35 U.S.C. 154(b) by 102 days.

(21) Appl. No.: 10/102,508

(22) Filed: Mar. 19, 2002

(65) Prior Publication Data

US 2003/0179447 A1 Sep. 25, 2003

(51) Int. Cl.[7] .................. G02B 21/00; G02B 15/14; G02B 6/38
(52) U.S. Cl. ................. 359/382; 359/368; 359/694; 385/56; 385/133
(58) Field of Search .............................. 359/362–363, 359/367–384, 694–706, 800–814; 385/56, 133, 147; 356/73.1, 359–360, 244, 440

(56) References Cited

U.S. PATENT DOCUMENTS

| | | | | |
|---|---|---|---|---|
| 4,571,037 A | * | 2/1986 | Esmay | 359/368 |
| 4,640,578 A | * | 2/1987 | Turner et al. | 359/804 |
| 5,459,564 A | * | 10/1995 | Chivers | 356/73.1 |
| 5,724,127 A | * | 3/1998 | Csipkes et al. | 356/73.1 |
| 6,215,555 B1 | * | 4/2001 | Chivers | 356/450 |
| 6,466,366 B1 | * | 10/2002 | Dominique | 359/379 |

\* cited by examiner

*Primary Examiner*—Thong Q. Nguyen
(74) *Attorney, Agent, or Firm*—Christensen O'Connor Johnson Kindness PLLC

(57) ABSTRACT

A microscope for inspecting each optical fiber endface in a multi-fiber connector is disclosed. The microscope includes a tip for interfacing with the multi-fiber connector, a slider assembly connected to the tip, a slider chassis capable of constraining the movement of the slider assembly along an axis of motion, and a cam assembly which forces the slider assembly to move along its constrained axis of motion. The cam assembly is rotated preferably by means of a remotely located adjustment knob. This rotational motion of the cam assembly results in a force against the slider assembly which causes it to move along its constrained axis of motion and, hence, causes the translation of the optical imaging axis of the microscope along the same axis such that each optical fiber endface may be inspected.

17 Claims, 5 Drawing Sheets

MICROSCOPE FOR BACKPLANE RIBBON FIBER ANALYSIS

FIELD OF THE INVENTION

The present invention relates generally to fiber-optic inspection systems, and more specifically to a microscope for inspecting fiber-optic endfaces in multi-fiber connectors.

BACKGROUND OF THE INVENTION

The proliferation of fiber-optic communications has lead to its wide spread implementation and use in industry. As a result, fiber-based communication systems have progressed toward utilizing multi-fiber connectors, such as fiber-optic ribbon connectors, for high density interconnects, rather than using electrical copper connectors as in the past. The increased use of these multi-fiber connectors, particularly in backplanes or in other situations in which the connectors are recessed and difficult to access, has created a need for a system that can adequately inspect the optical fibers while the connectors are still mounted.

It is well known in the industry that the endfaces of optical fibers must be kept clean and undamaged within fiber-optic communication systems. A fiber-optic endface is the cross-sectional surface that is created when an optical fiber is cut for termination. Failure to keep such endfaces clean and undamaged results in signal loss because of scattering effects at the endface of the optical fiber. As bandwidths increase, particularly with the rise of wavelength division multiplexing (WDM) technology, the need for cleanliness at the fiber-optic endface is even more important. Further, since fiber-optic communication systems handle heavy bandwidth traffic, the cleanliness at the fiber-optic endface is particularly important because the laser power driving the fiber-optic communication signals is typically higher. When a high-powered laser strikes a small piece of debris on the fiber-optic endface, the debris burns leaving a film of soot on the fiber-optic endface that degrades communication signals. As a result, the "dirty" fiber-optic endface at the interconnect point must be taken out of service and repaired.

However, backplane interconnects that accept fiber-optic arrays and communication system devices are notoriously difficult to access for maintenance, cleaning and repair. When a particular multi-fiber connector in a backplane needs service, a technician typically removes a module from a slot in a rack-mount system. A module is typically a printed circuit board, or "daughter card," that interfaces with a backplane in the rack-mount system when "plugged in." The technician then needs to inspect and clean the multi-fiber connectors located at the back of the empty slot from where the module was removed. A typical slot is 1.5 inches wide and 12 inches deep and rather difficult to access for service. Other than removing the multi-fiber connector from the backplane altogether, another way to view and clean the fiber-optic endfaces in the connector is to use a video microscope. Obviously, because of the narrow and deep nature of the empty slot, most microscopes are not manufactured to be used in this situation.

Some microscope manufacturers have designed "long reach" video microscopes to reach back into this cavity for visual rendering and cleaning purposes. However, these microscopes are unable to precisely locate and focus upon each fiber-optic endface situated within the multi-fiber connector. Because each and every fiber-optic endface needs to be inspected, it is essential to have a microscope capable of focusing upon each individual fiber-optic endface in the ribbon connector. Current long reach microscopes tend to "jump" quickly across the multi-fiber connector which holds the fiber-optic endfaces in a linear array. Consequently, these microscopes tend to skip over some fiber-optic endfaces. Furthermore, at high magnification it is very difficult to control the speed at which these microscopes pan across the multi-fiber connector. Thus, it cannot be assured that each and every fiber-optic endface has been focused upon and inspected properly.

Therefore, a need exists for a microscope capable of focusing upon each fiber-optic endface situated within a recessed multi-fiber connector.

SUMMARY OF THE INVENTION

In accordance with this invention a microscope for inspecting the endfaces of each optical fiber in a multi-fiber connector is provided.

The microscope comprises a tip, a slider assembly, a slider chassis and a cam assembly. The tip is designed to interface with a multi-fiber connector and is connected to the slider assembly. The slider assembly is in turn engaged with the slider chassis which constrains the movement of the slider assembly along an axis of motion. The cam assembly interfaces with the slider assembly and is capable of translating the slider assembly along its constrained axis of motion. By providing a means for controlling motion of the slider assembly back and forth, each fiber-optic endface in a multi-fiber connector can be located and inspected more precisely.

In accordance with further aspects of the present invention, the cam assembly includes a cam, a cam shaft and a cam tip. The cam tip is designed to interface with a groove in the backend of the slider assembly. The cam assembly is capable of being rotated by remote means, such as by a fine adjustment knob. The rotation of cam assembly and specifically the cam tip causes the translation of the slide assembly along its constrained axis of motion. In particular, when rotated the cam tip applies force to the groove of the slider assembly which in turn causes the translation of the slider assembly.

In accordance with yet further aspects of the present invention, in another embodiment, the microscope includes an optical imaging axis and a tip through which this optical imaging axis extends. As in the embodiments described above, the tip is designed to interface with a recessed multi-fiber connector. The tip of this embodiment also includes a set of surfaces for re-directing the optical imaging axis such that it is orthogonal to each of the fiber-optic endfaces of a multi-fiber connector. These surfaces preferably consist of two reflecting surfaces.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is a microscope for inspecting the endfaces of each optical fiber in a recessed multi-fiber connector, particularly where the connector is mounted in a backplane. In general and as will be further described below, the microscope includes a system for remotely translating the microscope to successively bring each fiber-optic endface into the center of the field of view of the microscope. In another embodiment of the present invention, the microscope includes a system for orthogonally illuminating and viewing the endfaces of optical fibers in the multi-fiber connector while mounted in the backplane.

Figure 1:
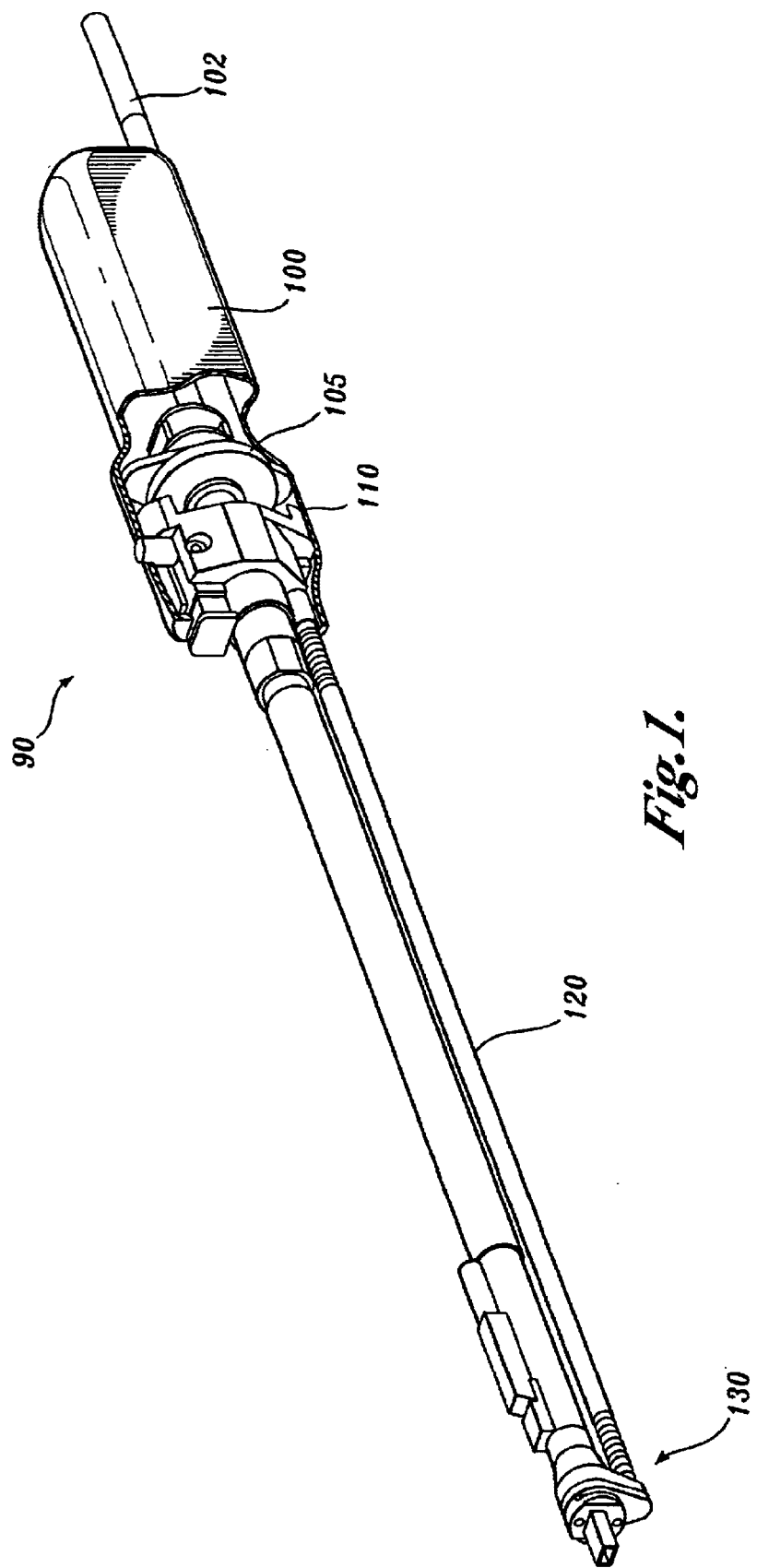
FIG. 1 is a pictorial view of one embodiment of a microscope formed in accordance with this invention.

FIG. 1 illustrates a microscope 90 of the present invention. The microscope 90 is capable of interfacing with a multi-fiber connector typically used in rack-mount systems. The microscope 90 includes a handle 100, a control assembly 110, a cam shaft 120, and a connector interface assembly 130. Aspects of each of these features is discussed in detail below.

The handle 100 is attached to a visual display interface cable 102. The visual display interface cable 102 connects to a typical microscope visual display wherein a user is able to view that which the microscope is focused upon. Within the handle 100, the display interface cable 102 connects to a microscope display interface (not shown) wherein a signal is generated that is a representation of the optical view of the microscope. Since the transmission and display of microscope signals is well known in the art, these features will not be further discussed herein.

The microscope handle 100 houses a control assembly 110 that is used to adjust the view of the microscope 90. The control assembly 110 contains a fine adjustment knob 105 that interfaces with the cam shaft 120. The fine adjustment knob 105 interfaces with the cam shaft 120 in such a way that rotating the fine adjustment knob 105 causes the cam shaft 120 to similarly rotate. If the fine adjustment knob 105 is rotated clockwise, the cam shaft 120 rotates counter-clockwise. If the fine adjustment knob 105 is rotated counter-clockwise, the cam shaft 120 rotates clockwise. It will be appreciated by those skilled in the art and others that the mechanism for rotating the cam shaft 120 could alternatively comprise a motor or other rotation causing means.

The cam shaft 120 is preferably long and narrow such that it can be inserted into a single empty slot in a rack-mount system in order to allow the connector interface assembly 130 to interface with a multi-fiber connector on the backplane of the rack-mount system. In addition, the cam shaft 120 is also preferably positioned parallel to the optical imaging axis of the microscope. However, it will be appreciated by those skilled in the art and others that a joint could be put into the cam shaft so that it is not parallel to the optical imaging axis of the microscope, but is still capable of reaching a recessed fiber-optic connector. Aspects of the connector interface assembly 130 interface are discussed in detail below with respect to FIGS. 2 and 3.

Figure 2:
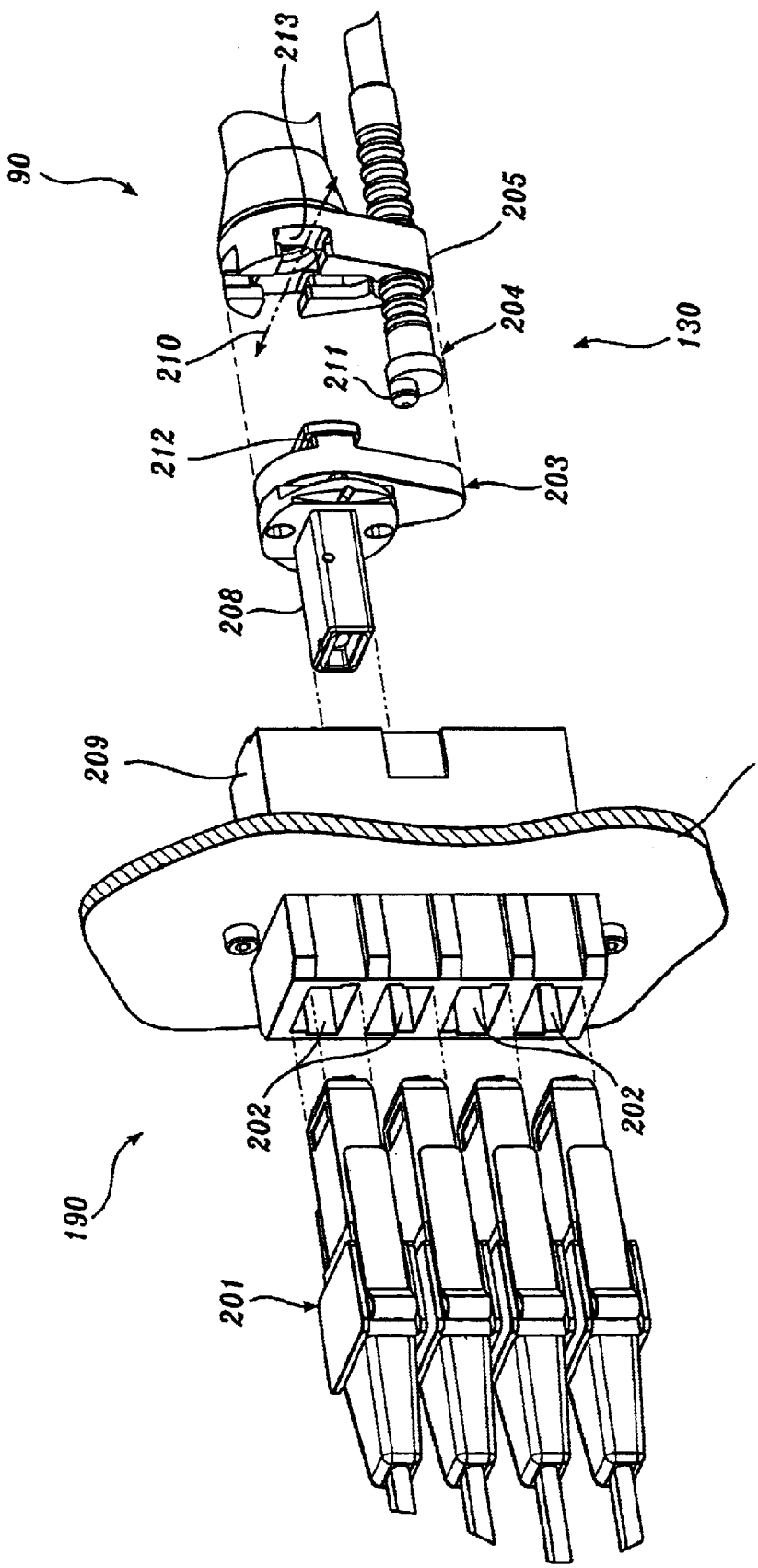
FIG. 2 is an exploded view of a portion of the microscope formed in accordance with the present invention shown in relation to a fiber-optic interconnection point.

FIG. 2 depicts an expanded view of the connector interface assembly 130 of the microscope 90 and a backplane connection point in a typical rack-mount system 190. The rack-mount system 190 contains a bulkhead 207 that has several connector receptacles 202 capable of interfacing with typical fiber-optic connectors 201. Each of the connector receptacles 202 in the backplane of the rack-mount system 190 provides a connection point wherein one of the fiber-optic connectors 201 can be inserted. Each of the fiber-optic connectors 201 includes multiple fiber terminations which are used to provide a communication link with a device inserted into a device receptacle 209 in the rack-mount system 190. It will be appreciated by those skilled in the art and others that the bulkhead 207 can alternatively serve as a connection point between fiber-optic connectors to provide a longer communication link. In this case, the device receptacle 209 of the bulkhead 207 would be replaced by another fiber-optic receptacle capable of interfacing with another fiber-optic connector.

Each individual fiber-optic connector 201 has at least two fiber-optic strands terminated therein. Each fiber-optic strand is terminated at the fiber-optic connector 201 such that an endface of the fiber-optic strand can interface with a typical communication device such as, for example, a daughter card inserted into the device receptacle 209 of the rack-mount system 190. A terminated fiber-optic strand is cut and polished to a high degree of precision for purposes of optimizing signal propagation. Each fiber-optic endface is either "flat" (i.e., orthogonal to the optical axis of the fiber) or cut at an angle. Preferably, each fiber-optic endface is cut at an angle of 8 degrees from vertical (plus or minus 0.1 degrees) to reduce signal degradation caused by reflection. Once the fiber-optic connector 201 is inserted into the connector receptacle 202, the fiber-optic endfaces within the connector 201 are exposed to the other side of the bulkhead 207 and are ready to interface a communication device or another fiber-optic connector. When the inserted fiber-optic connector 201 is not interfaced with a communication device or another fiber-optic connector at the bulkhead 207, the microscope 90 of the present invention can be inserted into the empty device receptacle 209. The microscope 90 is used for inspecting the endfaces of each fiber-optic strand terminated at the fiber-optic connector 201 which is connected to the connector receptacle 202 corresponding to the device receptacle 209 in which the microscope is inserted.

Components of the connector interface assembly 130 include a slider assembly 203, a microscope cam 204, a slider chassis 205, and an engagement tip 208. The microscope cam 204 is attached to an anterior end of the cam shaft 120 which is supported by the slider chassis 205. More specifically, the slider chassis 205 contains a cavity through which the anterior end of the cam shaft 120 passes and is allowed to rotate. The microscope cam 204 preferably has a cam tip 211 attached to its anterior end for interfacing with the slider assembly 203. As will be described in further detail in reference to FIG. 3, the cam tip 211 is inserted into a groove on a back side of the slider assembly 203 and when rotated causes the slider assembly 203 to move along a constrained axis of motion. Essentially, the cam is an eccentrically mounted bearing which rides in a closely toleranced groove on the slider assembly.

As further shown in FIG. 2, the slider assembly 203 interfaces the slider chassis 205 such that the slider assembly 203 is able to freely move back and forth in an axis of motion, preferably moving horizontally, as shown by the bi-directional arrow 210. In particular, the slider assembly 203 includes a flanged insert element 212 that engages with a channel 213 in the slider chassis 205. The slider chassis 205 suitably includes an upper and lower lip portion along the channel 213 for securing the slider assembly 203 to the slider chassis 205. The channel 213 includes open ends for allowing the flanged insert 212, and hence the slider assembly 203, to slide back and forth along the longitudinal, and preferably horizontal, axis of the channel 213. The channel and lip portions of the slider chassis 205 are sometimes referred to in the art as a T-slot with a gib. It will be appreciated by those skilled in the art and others that the slider assembly 203 and slider chassis 205 could alternatively include any mechanism for securing the slider assembly to the slider chassis, while also allowing for the back and forth movement of the slider assembly 203 along an axis of motion.

FIG. 2 further illustrates that the slider assembly 203 is also attached to the engagement tip 208. The engagement tip 208 is in turn designed to engage with fiber-optic connector and to provide the pathway through which an optical imaging axis of the microscope 90 extends. Since the optical features of a microscope and general knowledge of the optical nature of a microscope is well-known, these aspects of the microscope 90 will not be further discussed herein.

As generally described above, when inspection of the fiber-optic connectors 201 in the bulkhead 207 is required, the microscope 90 is inserted into an empty slot in the rack-mount system 190. The engagement tip 208 is designed to interface with the empty device receptacle 209 of the bulkhead 207 such that the optical interface of the microscope can focus upon the fiber-optic endfaces in the fiber-optic connector 201. Once the engagement tip 208 is inserted into the bulkhead 207, the microscope cam 204, cam shaft 120, and cam tip 211, together identified as the cam assembly, can be rotated clockwise or counterclockwise using the fine adjustment knob 105 in order to move the slider assembly 203 either left or right in order to focus precisely upon each of the fiber-optic endfaces in the fiber-optic connector 201.

Figure 3:
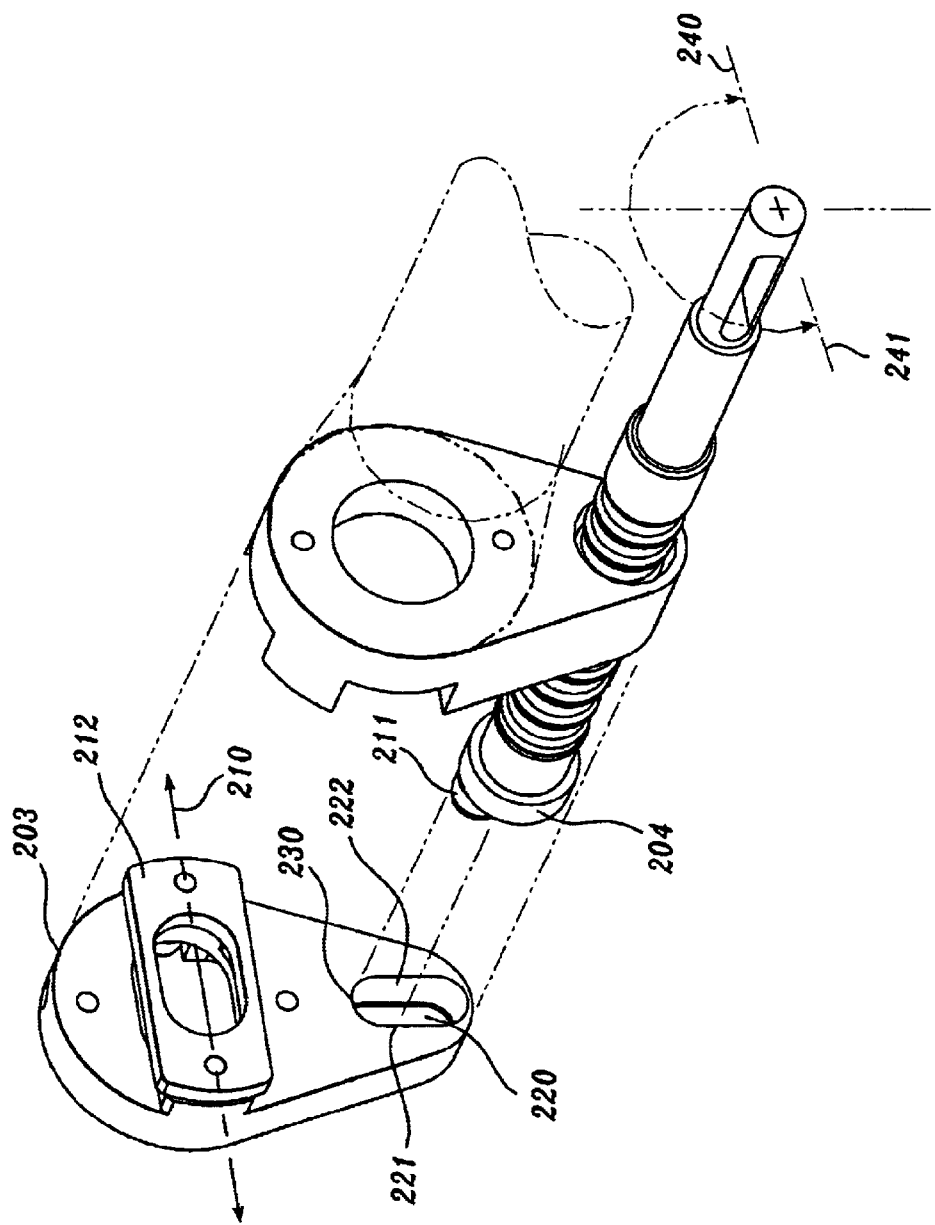
FIG. 3 is a rear view of a slider assembly portion of the microscope formed in accordance with the present invention shown in relation to a microscope cam.

FIG. 3 depicts the interface between the slider assembly 203 and the cam tip 211 in greater detail. The back side of the slider assembly 203 includes a groove 220 that has a width which is preferably equivalent to the diameter of the cam tip 211. The length of the groove 220 is preferably equivalent to the diameter of the microscope cam 204. The cam tip 211 is positioned on the cam 204 such that when the microscope cam 204 is rotated, the cam tip 211 creates a force on the groove 220 either on a left inside face 221 or a right inside face 222 of the groove 220. As the microscope cam 204 is rotated, the force of the cam tip 211 causes the slider assembly 203 to move left or right consistent with the point of rotation of the microscope cam 204. When the cam tip 211 is at a top vertical point 230, or the zero degree point, a clockwise rotation of the microscope cam 204 causes a force upon the right inside face 222 of the groove 220. A force on the right inside face 222 of the groove 220 causes the slider assembly 203 to move from left to right along the preferably horizontal axis of motion shown by the directional arrow 210. As the microscope cam 204 continues to rotate clockwise, the force switches and is applied to the left inside face 221 of the groove when rotation reaches a 90 degree point 240. Once the microscope cam reaches a 270 degree point 241, the force again switches back to the right inside face 22 of the groove 220. A counter-clockwise rotation of the microscope cam will cause the opposite forces to be applied to the inside faces of the groove 220.

It will be appreciated by those skilled in the art and others that the microscope cam 204 does not have to include a cam tip, but alternatively could itself be shaped to perform the functions described above with reference to the cam tip 211.

Figure 4:
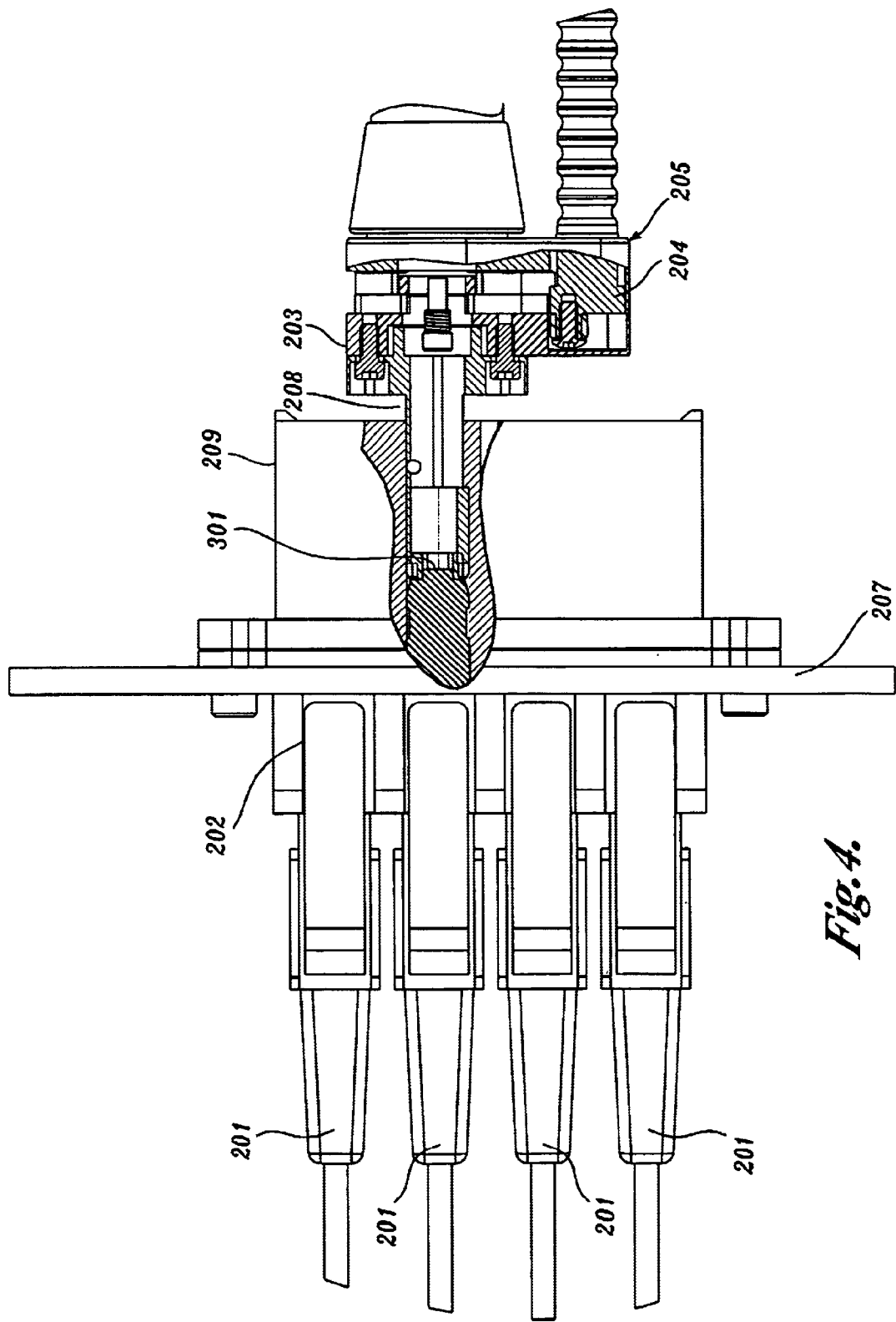
FIG. 4 is an environmental view of a portion of the microscope formed in accordance with the present invention shown interfacing with a fiber-optic interconnection point.

FIG. 4 is an environmental view of the microscope 90 interfacing with a fiber optic connector 201 in the bulkhead 207. The engagement tip 208 of the microscope 90 is inserted into the empty device receptacle 209 of the bulkhead 207 such that the optical interface of the microscope 90 is focused upon a first fiber-optic endface 301. In this embodiment, the endface 301 is cut flat, i.e., orthogonal to the optical axis of the fiber within 0.1 degrees. As will be described further below in reference to another embodiment of the invention, the endface could alternatively be angled. The slider assembly 203 is able to freely move back and forth in the channel 213 of the slider chassis 205 when the microscope cam assembly is rotated by rotating the fine adjustment knob 105 as described above. This controlled back and forth movement of the slider assembly provides a user with the ability to view the end face of each fiber along the linear array of fibers in the fiber-optic connector 201.

Figure 5:
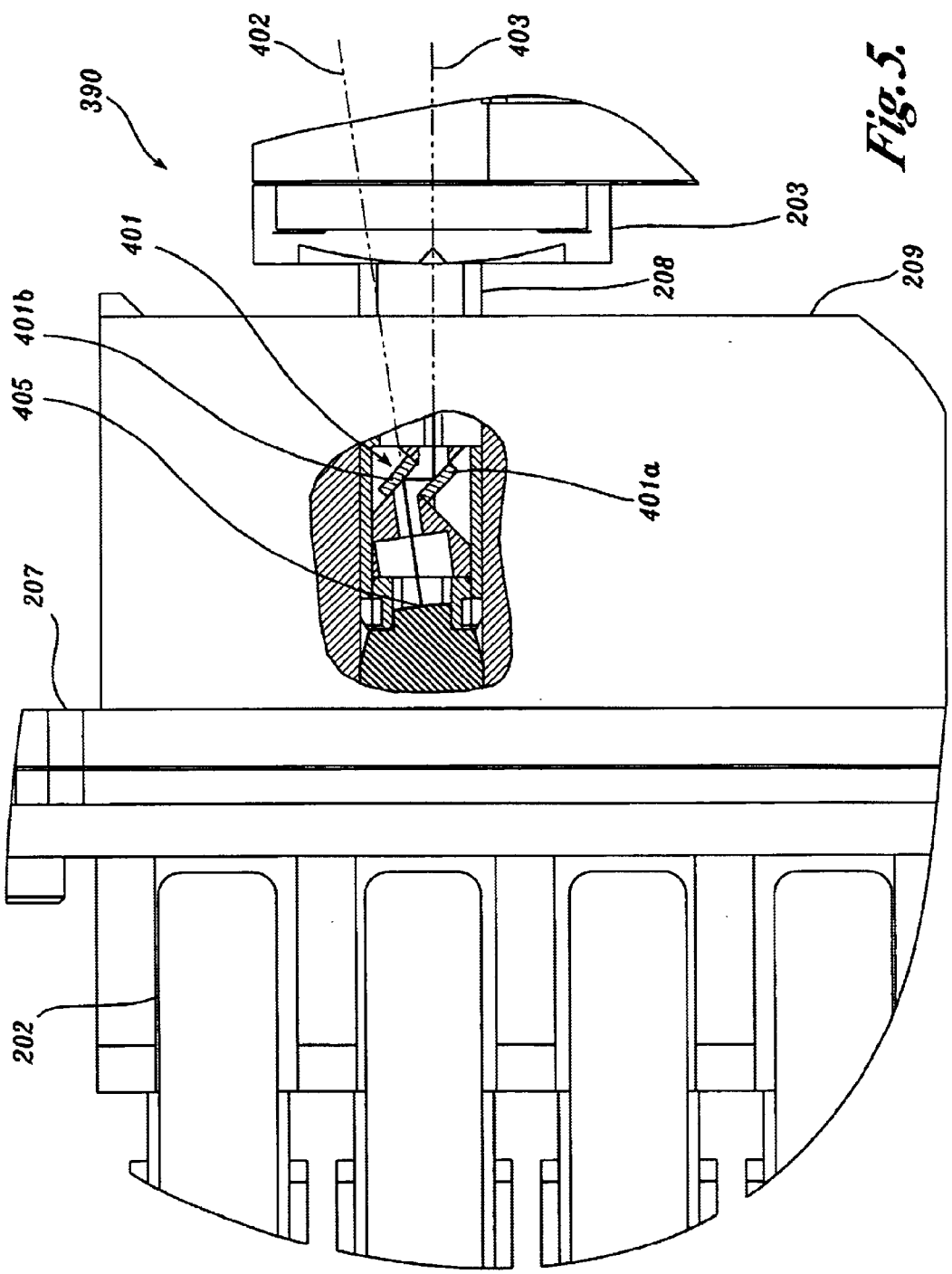
FIG. 5 is an interior environmental view of a portion of another embodiment of a microscope formed in accordance with the present invention shown interfacing a single angled, fiber-optic endface of a ribbon connector and illustrating orthogonal illumination of the endface.

FIG. 5 is an interior environmental view of a portion of a microscope 390 formed in accordance with another embodiment of the present invention shown engaged with a fiber-optic connector and specifically in relation to a single fiber-optic endface within that connector. The microscope 390 includes the same elements described above in relation to microscope 90 with one modification. The engagement tip 208 of microscope 390 includes a set of reflecting surfaces for more adequately viewing an endface 301 which was cut at an angle.

As previously described, when the fiber-optic strand is cut for termination, the endface is not always perpendicular with the signal propagation axis of the fiber-optic strand. A fiber-optic endface is sometimes cut at an angle, preferably an angle of 8 degrees from vertical (plus or minus 0.1 degrees), to reduce signal degradation caused by reflection. This results in an endface, such as endface 405 shown in FIG. 5, that has an endface orthogonal optical axis 402 that is not parallel with the microscope's original optical imaging axis 403. In this case, the microscope focuses on the endface 405 at an angle and thus does not adequately illuminate or focus on the endface to be able to distinguish surface features of the fiber-optic endface. In order to ensure proper inspection of fiber-optic endface 405, it is important to inspect the fiber-optic endface 405 with a microscope optical imaging axis 403 that is parallel to the endface orthogonal optical axis 402. Because the microscope optical imaging axis 403 cannot be easily rotated to match the orthogonal optical axis of the fiber-optic endface 301, it is necessary to augment the optical axis of the microscope 390 by use of a set of surfaces designed to create a resultant optical axis which is orthogonal to the endface being inspected.

As shown in FIG. 5, the engagement tip 208 of microscope 390 houses a set of surfaces 401 that are mounted to augment the microscope optical imaging axis 403. The set of surfaces 401 are preferably reflective and are mounted within the engagement tip 208 such that the view of the microscope 390 along its optical axis 403 is reflected from a first reflective surface 401a to a second reflective surface 401b to create a resultant microscope optical imaging axis which is orthogonal to endface 405. As a result, the endface 405 can be properly inspected.

While the preferred embodiment of the invention has been illustrated and described, it will be appreciated that various changes can be made therein without departing from the spirit and scope of the invention. For example, the length of the cam shaft can be modified to suit the particular application in which fiber-optic endfaces must be examined. Thus, it will also be appreciated that the microscope cam can be activated from any distance from the slide assembly. In addition, any number of reflective surfaces may be used to modify the optical imaging axis of the microscope such that it is orthogonal to the fiber-optic endface being inspected. Even further, these surfaces do not necessarily need to be reflective as long as they redirect the optical imaging axis such that it is orthogonal to the endface being inspected.

The embodiments of the invention in which an exclusive property or privilege is claimed are defined as follows:

1. A microscope for inspecting an endface of an optical fiber in a fiber-optic connector, the fiber-optic connector having multiple fiber-optic endfaces, the microscope comprising:
    a tip capable of interfacing with the fiber-optic connector;
    a slider assembly attached to the tip, the slider assembly capable of moving along an axis of motion;
    a slider chassis engaging a back end of the slider assembly and constraining the movement of the slider assembly to the axis of motion; and
    a cam assembly interfacing the slider assembly, the cam assembly capable of translating the slider assembly along the constrained axis of motion.

2. The microscope of claim 1, wherein the cam assembly includes a cam and a cam shaft attached to the cam, the cam and cam shaft capable of rotating, the translation of the slider assembly caused by the rotation of the cam and cam shaft.

3. The microscope of claim 2 further comprising means for remotely rotating the cam assembly.

4. The microscope of claim 3, wherein the means for remotely rotating the cam assembly includes an adjustment knob.

5. The microscope of claim 2, wherein the cam includes a cam tip and the back end of the slider assembly includes a groove for receiving the cam tip and wherein the translation of the slider assembly is caused by force applied within the slider assembly groove by the rotating cam tip.

6. The microscope of claim 1, wherein the cam assembly includes a cam shaft having a length suitable for allowing the tip, slider assembly and slider chassis to interface with a recessed fiber-optic connector.

7. The microscope of claim 6, wherein the cam shaft is mounted parallel to an optical imaging axis of the microscope.

8. The microscope of claim 1, wherein the tip includes a set of surfaces capable of creating a resultant optical imaging axis orthogonal to the fiber-optic endface being inspected.

9. The microscope of claim 8, wherein the set of surfaces are reflective surfaces.

10. A microscope for inspecting an endface of an optical fiber in a recessed multi-fiber connector, the endface having an angled surface in relation to the optical axis of the optical fiber, the microscope comprising:
    a tip capable of interfacing with the recessed multi-fiber connector and through which the optical imaging axis of the microscope extends;
    wherein the tip includes a set of surfaces capable of redirecting the optical imaging axis of the microscope to produce a resultant optical imaging axis orthogonal to the fiber-optic endface in the recessed connector.

11. The microscope of claim 10, wherein the set of surfaces are reflective surfaces.

12. The microscope of claim 11, wherein the set of reflective surfaces comprises two reflective surfaces.

13. The microscope of claim 10 further comprising:
    a slider assembly attached to the tip, the slider assembly capable of moving along an axis of motion;
    a slider chassis engaging the slider assembly and constraining the movement of the slider assembly to the axis motion; and
    a cam assembly interfacing with the slider assembly, the cam assembly capable of translating the slider assembly along the constrained axis of motion.

14. The microscope of claim 13, wherein the cam assembly includes a cam shaft having a length suitable for allowing the tip, slider assembly and slider chassis to interface with a recessed multi-fiber connector.

15. A microscope for inspecting each fiber-optic endface in a multi-fiber connector, the multi-fiber connector including a linear array of optical fibers, the microscope comprising:
    a tip capable of interfacing with the multi-fiber connector;
    a slider assembly attached to the tip, the slider assembly capable of moving along an axis of motion;
    a slider chassis engaging the slider assembly and constraining the movement of the slider assembly to the axis motion;
    a cam assembly interfacing with the slider assembly, the cam assembly capable of translating the slider assembly along the constrained axis of motion; and
    means for remotely rotating the cam assembly to cause the translation of the slide assembly.

16. The microscope of claim 15, wherein the cam assembly includes a cam and a cam shaft attached to the cam; and the back end of the slider assembly includes a groove for receiving the cam; and
    wherein the translation of the slide assembly is caused by force applied within the slider assembly groove by the cam when being rotated.

17. The microscope of claim 15, wherein the tip includes a set of surfaces capable of creating a resultant optical imaging axis orthogonal to the fiber-optic endface being inspected.

* * * * *